(12) United States Patent
Sandoval et al.

(10) Patent No.: US 10,386,070 B2
(45) Date of Patent: Aug. 20, 2019

(54) MULTI-STREAMED DILUTION HOLE CONFIGURATION FOR A GAS TURBINE ENGINE

(71) Applicant: United Technologies Corporation, Farmington, CT (US)

(72) Inventors: Jonathan P. Sandoval, Hebron, CT (US); Randolph Smith, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 409 days.

(21) Appl. No.: 15/105,367

(22) PCT Filed: Dec. 23, 2014

(86) PCT No.: PCT/US2014/072200
§ 371 (c)(1),
(2) Date: Jun. 16, 2016

(87) PCT Pub. No.: WO2015/100346
PCT Pub. Date: Jul. 2, 2015

(65) Prior Publication Data
US 2016/0327272 A1 Nov. 10, 2016

Related U.S. Application Data

(60) Provisional application No. 61/920,243, filed on Dec. 23, 2013.

(51) Int. Cl.
*F02C 1/00* (2006.01)
*F23R 3/06* (2006.01)
*F23R 3/00* (2006.01)
*F23R 3/50* (2006.01)

(52) U.S. Cl.
CPC ............... *F23R 3/06* (2013.01); *F23R 3/002* (2013.01); *F23R 3/50* (2013.01); *F23R 2900/03041* (2013.01); *Y02T 50/675* (2013.01)

(58) Field of Classification Search
CPC .. F23R 2900/03041; F23R 3/002; F23R 3/06; F23R 3/50; Y02T 50/675
See application file for complete search history.

(56) References Cited

U.S. PATENT DOCUMENTS

| | | | |
|---|---|---|---|
| 3,019,605 A * | 2/1962 | Reginald | F23R 3/06 60/759 |
| 3,545,202 A | 12/1970 | Batt et al. | |
| 4,132,066 A | 1/1979 | Austin, Jr. et al. | |

(Continued)

FOREIGN PATENT DOCUMENTS

WO    WO2013050105 A1    4/2013

OTHER PUBLICATIONS

EP search report for EP14873461.5 dated Apr. 20, 2017.

Primary Examiner — Jesse S Bogue
(74) Attorney, Agent, or Firm — O'Shea Getz P.C.

(57) ABSTRACT

A combustor component defining a dilution hole configuration for a combustor wall assembly of a gas turbine engine has first and second dilution holes that communicate radially with one-another and with respect to respective centerlines of each dilution hole. In operation, each dilution hole forms a respective jet stream along respective centerlines for flowing cooling air into a combustion chamber.

16 Claims, 4 Drawing Sheets

(56) References Cited

U.S. PATENT DOCUMENTS

| | | | |
|---|---|---|---|
| 4,426,841 A | | 1/1984 | Cornelius et al. |
| 4,622,821 A | * | 11/1986 | Madden .................... F23R 3/06 60/755 |
| 4,653,279 A | * | 3/1987 | Reynolds .................. F23R 3/06 60/755 |
| 4,700,544 A | | 10/1987 | Fucci |
| 4,875,339 A | * | 10/1989 | Rasmussen ............. F23R 3/045 60/757 |
| 4,887,432 A | * | 12/1989 | Mumford .................. F23R 3/06 60/759 |
| 5,096,379 A | | 3/1992 | Stroud et al. |
| 5,187,937 A | * | 2/1993 | Stevens .................... F23R 3/06 60/752 |
| 5,220,795 A | | 6/1993 | Dodds et al. |
| 5,239,818 A | * | 8/1993 | Stickles .................... F23R 3/04 60/737 |
| 5,687,572 A | | 11/1997 | Schrantz et al. |
| 6,070,412 A | | 6/2000 | Ansart et al. |
| 8,056,342 B2 | | 11/2011 | Shelley et al. |
| 9,010,121 B2 | * | 4/2015 | Taylor ..................... F23R 3/002 60/752 |
| 9,038,395 B2 | * | 5/2015 | Rudrapatna ............. F23R 3/06 60/754 |
| 9,341,372 B2 | * | 5/2016 | Penz ....................... F23R 3/007 |
| 9,360,215 B2 | * | 6/2016 | McKenzie ............. F23R 3/007 |
| 2002/0116929 A1 | | 8/2002 | Snyder |
| 2002/0189260 A1 | * | 12/2002 | David ..................... F23R 3/045 60/746 |
| 2003/0213250 A1 | | 11/2003 | Pacheco-Tougas et al. |
| 2011/0048024 A1 | | 3/2011 | Snyder et al. |
| 2012/0102963 A1 | | 5/2012 | Corr et al. |
| 2012/0144835 A1 | | 6/2012 | Taylor et al. |
| 2013/0025288 A1 | | 1/2013 | Cunha et al. |
| 2015/0059344 A1 | | 3/2015 | Sandelis |

* cited by examiner

MULTI-STREAMED DILUTION HOLE CONFIGURATION FOR A GAS TURBINE ENGINE

This application claims priority to PCT Patent Application No. PCT/US14/072200 filed Dec. 23, 2014 which claims priority to U.S. Patent Application No. 61/920,243 filed Dec. 23, 2013, which are hereby incorporated herein by reference in their entireties.

BACKGROUND

The present disclosure relates to a gas turbine engine and, more particularly, to a component having a dilution hole configuration in combustors.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a wall assembly having an outer shell lined with heat shields that are often referred to as floatwall panels. Together, the panels define a combustion chamber. A plurality of dilution holes are generally spaced circumferentially about the wall assembly and flow dilution air from a cooling plenum and into the combustion chamber to improve emissions, and reduce and control the temperature profile of combustion gases at the combustor outlet to protect the turbine section from overheating. To ensure a satisfactory temperature profile at the chamber outlet, there must be adequate penetration of the dilution air, coupled with the correct number of dilution holes to form sufficient localized mixing zones in the chamber. The penetration of a round dilution hole is generally a function of its diameter. That is, if the total dilution hole area is spread over a large number of small holes, penetration will be inadequate, and a hot core (i.e. radial center of combustion chamber) will persist through the dilution zone of the chamber. In the opposite extreme, the use of a small number of large holes will result in a cold core, due to over-penetration and unsatisfactory mixing.

To optimize this outlet temperature profile, the dilution holes are strategically sized and distributed both axially and circumferentially through the wall assembly. Part of this strategic sizing and location of dilution holes must include consideration of combustor chamber pressure differentials, cross flows and minimization of hot spots upon the panels and typically located proximate to the dilution holes. Spatial limitations in spacing the grommets can lead to inefficiencies. Thus, continued improvements in dilution hole configurations and the structures which define them are desired in the art.

SUMMARY

A combustor component defining a dilution hole configuration according to a non-limiting embodiment of the present disclosure has a first grommet defining a first dilution hole having a first centerline, and a second grommet defining a second dilution hole having a second centerline and directly fluidly coupled to the first dilution hole.

Additionally to the foregoing embodiment, the first and second grommets are integrally formed with one-another to form a non-circular aperture having the first and second dilution holes.

In the alternative or additionally thereto, in the foregoing embodiment the component includes a first lobe, a second lobe spaced from and opposing the first lobe, and wherein the first and second grommets extend from and connect to the first and second lobes.

In the alternative or additionally thereto, in the foregoing embodiment the first and second grommets and the first and second lobes together define a continuously extending face around the first and second centerlines.

In the alternative or additionally thereto, in the foregoing embodiment the first and second grommets together define a circumferentially continuous seat axially offset from the face relative to the first and second centerlines.

In the alternative or additionally thereto, in the foregoing embodiment the first and second lobes define a gap therebetween, the first dilution hole has a first radius, the second dilution hole has a second radius, and the gap is less than the combined first and second radii.

In the alternative or additionally thereto, in the foregoing embodiment the first dilution hole is a primary dilution hole and the second dilution hole is a wake hole.

In the alternative or additionally thereto, in the foregoing embodiment the component includes a heat shield and a shell with a cooling cavity defined between the heat shield and the shell, and wherein the first and second dilution holes communicate through the heat shield and the shell, and the first and second grommets are at least in-part in the cooling cavity.

In the alternative or additionally thereto, in the foregoing embodiment the seat is in sealing contact with the shell and the face is defined by a distal end portion of the first and second grommets projecting axially outward from the seat.

In the alternative or additionally thereto, in the foregoing embodiment the first and second centerlines are substantially parallel to one-another.

A combustor according to another non-limiting embodiment of the present disclosure includes a heat shield including a hot side and an opposite cold side, a boss projecting outward from the cold side of the heat shield, a first lobe projecting from the boss, and wherein the boss and the first lobe together carry a concave inner face that at least partially defines a dilution aperture.

Additionally in the foregoing embodiment, the boss is flush with the hot side.

In the alternative or additionally thereto, in the foregoing embodiment the dilution aperture includes first and second dilution holes defined in-part by the first lobe, the first and second dilution holes have respective first and second centerlines, and the first and second dilution holes communicate radially with respect to the first and second centerlines.

In the alternative or additionally thereto, in the foregoing embodiment the combustor includes a second lobe projecting from the boss opposite the first lobe.

In the alternative or additionally thereto, in the foregoing embodiment the combustor includes a first grommet of the boss defining at least in-part the first dilution hole, and a second grommet of the boss defining at least in-part the second dilution hole directly fluidly coupled to the first dilution hole.

In the alternative or additionally thereto, in the foregoing embodiment the boss is an integral and unitary part of the heat shield.

In the alternative or additionally thereto, in the foregoing embodiment the combustor includes a shell spaced from the heat shield, and the boss has a distal portion projecting through a single opening in the shell.

A method of operating a dilution hole configuration according to another non-limiting embodiment of the present disclosure includes fluidly coupling first and second dilution holes in a combustor.

Additionally to the foregoing embodiment, further steps include supplying cooling air to a plenum at a higher pressure than in a combustion chamber, creating a first jet stream along a first centerline of the first dilution hole, creating a second jet stream along a second centerline of the second dilution hole, and flowing the cooling air via the first and second jet streams into the combustion chamber.

In the alternative or additionally thereto, in the foregoing embodiment the method has a further step of controlling a temperature profile at an exit plane of the combustion chamber via cooling air flow from the first and second jet streams.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
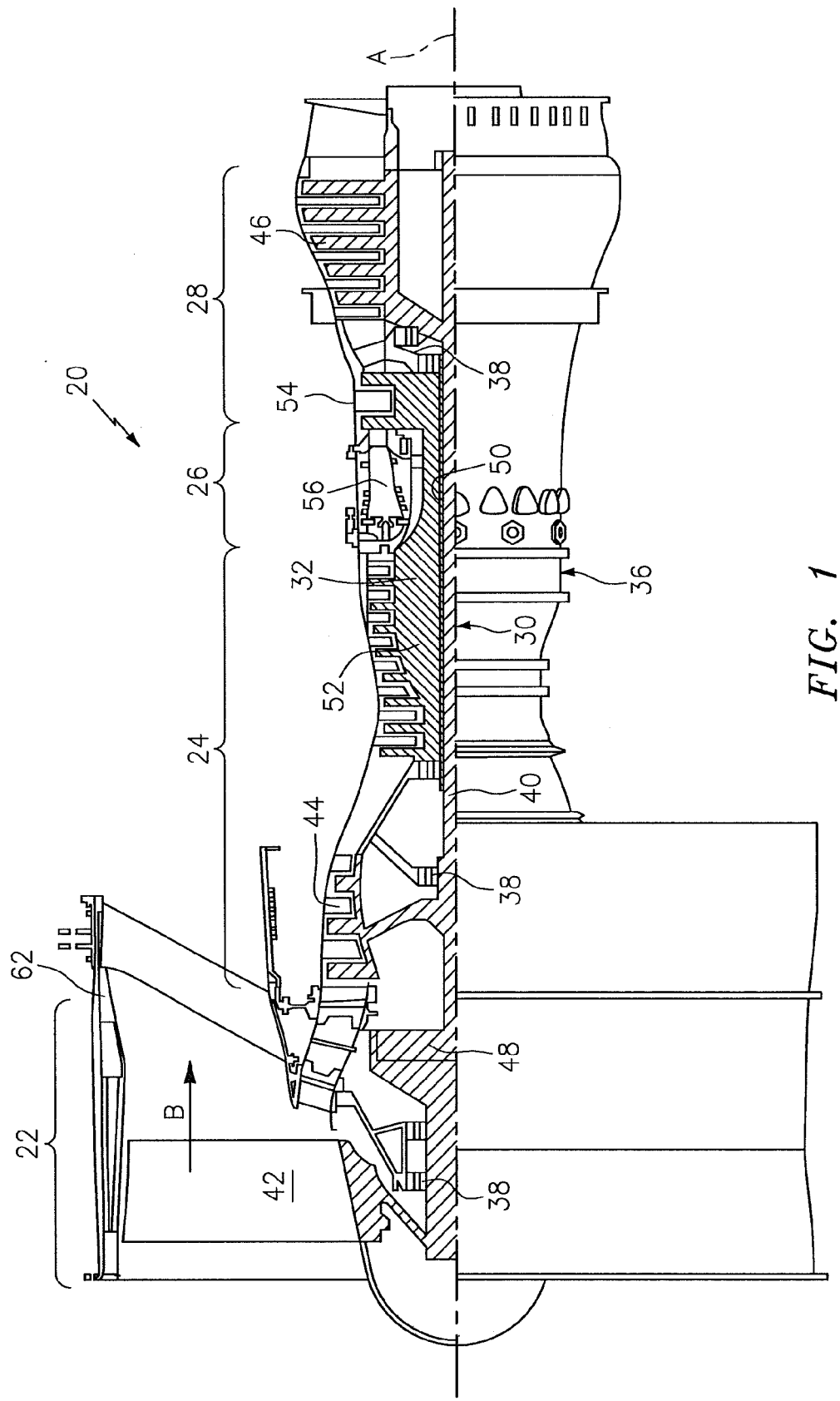
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
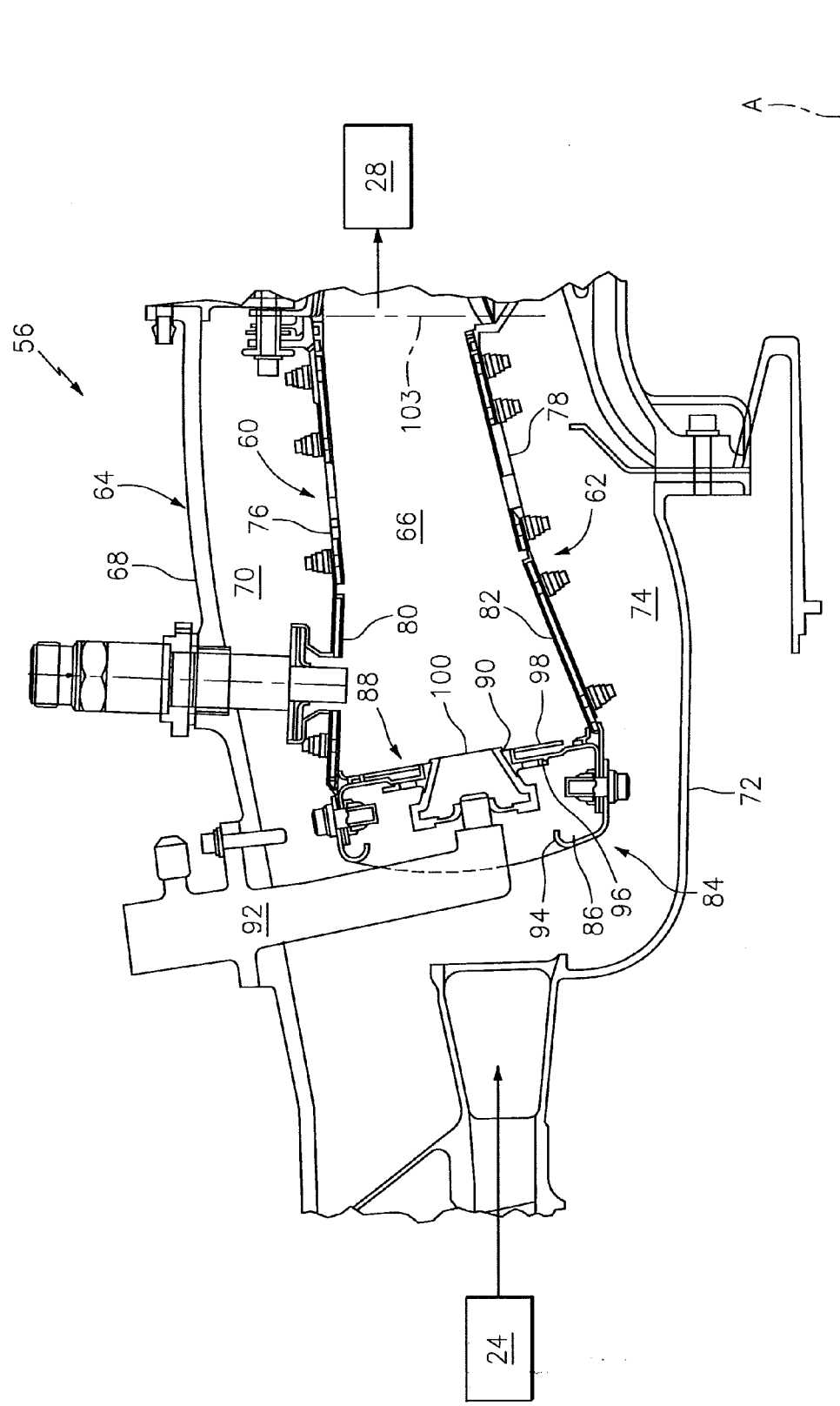
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween.

The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner configuration mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forwardmost ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
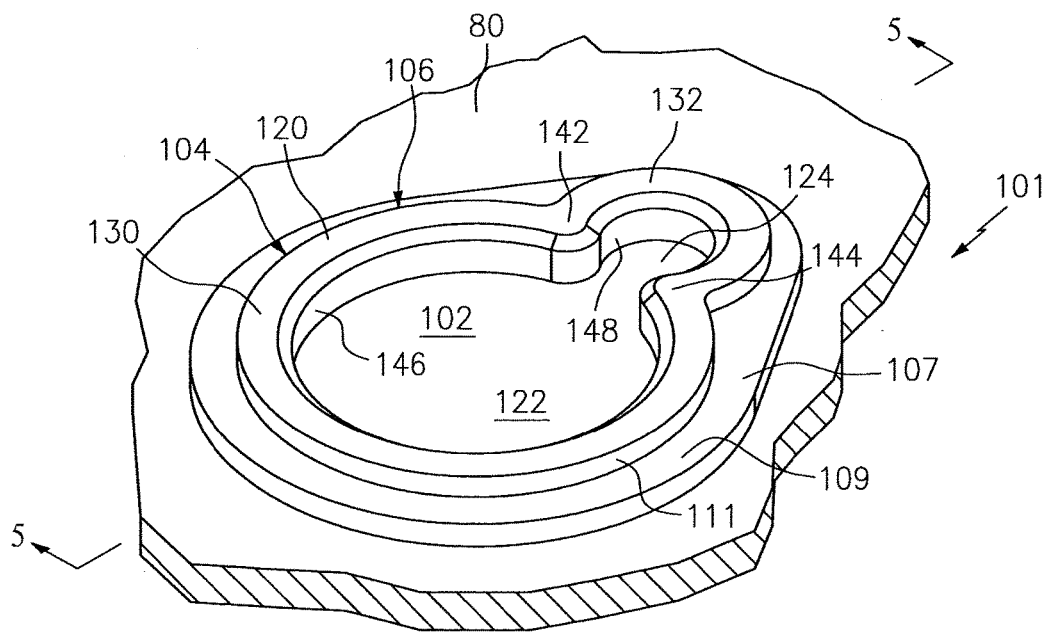
FIG. 3 is a partial perspective view of a dilution hole configuration according to one non-limiting example of the present disclosure.
Figure 4:
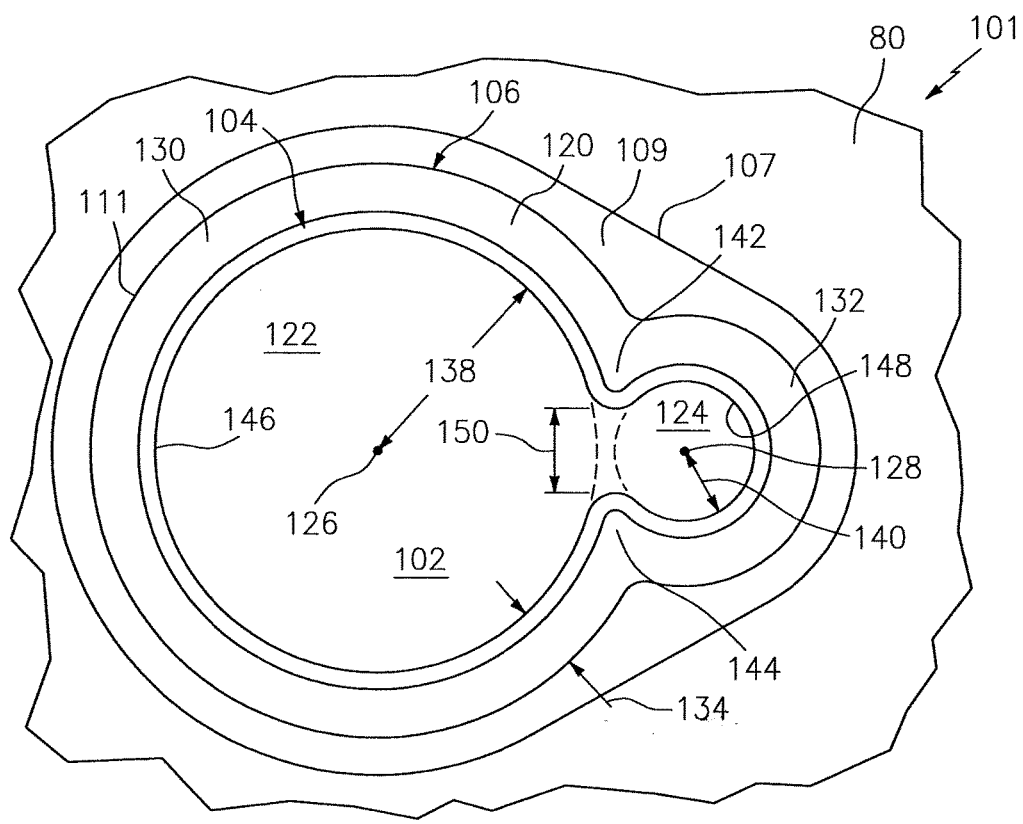
FIG. 4 is a plan view of the dilution hole configuration.
Figure 5:
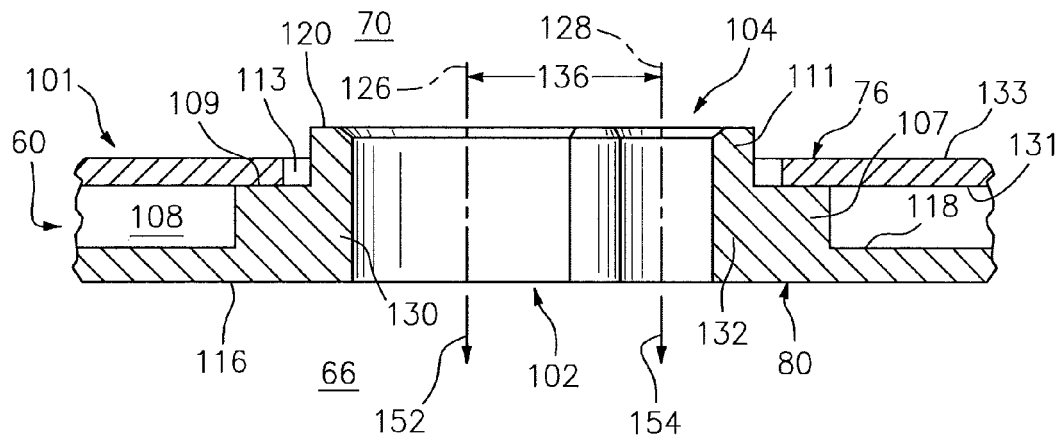
FIG. 5 is a cross section view of the dilution hole configuration taken along line 5-5 of FIG. 3.

Referring to FIGS. 3 through 5, the wall assemblies 60, 62 of the combustor 56 may have a plurality of combustor components 101 each having a dilution aperture 102. Each component 101*t* may generally be spaced circumferentially about the respective wall assemblies 60, 62. The aperture 102 is generally oblong in flow cross section and injects dilution air from the outer and inner plenums 70, 74 and into the combustion chamber 66. For clarity, the term flow cross section is generally orthogonal to the direction of dilution air flow, and the flow is in a radial direction with respect to the engine axis A. The dilution air flow facilitates low emissions, and reduces and controls the temperature profile of combustion gases at a combustor exit plane 103 to protect the HPT 54.

To ensure a satisfactory temperature profile at the combustor exit plane 103, there must be adequate penetration of the dilution air, coupled with the correct number of dilution apertures 102 to form sufficient localized mixing zones. The flow penetration of a dilution aperture is generally a function of its flow area. That is, if the total dilution aperture area is spread over a large number of small holes, penetration will be inadequate, and a hot core will persist through the dilution zone of the chamber 66. In the opposite extreme, the use of a small number of large apertures will result in a cold core due to over-penetration and unsatisfactory mixing.

To optimize this outlet temperature profile, the aperture 102 of the combustor component 101 is part of a respective dilution hole configuration 104, and each wall assembly 60, 62 may have at least one combustor component 101 and thus at least one dilution hole configuration 104. For the sake of explanation; however, the outer wall assembly 60, alone, will be used to describe the combustor component 101 with the understanding that the same principles apply to the inner wall assembly 62.

Each aperture 102 is generally defined by an inner surface of a continuous boss 106, and an outer surface of the boss defines in-part a cooling cavity 108 (see FIG. 5). The cooling cavity 108 is further defined radially between the heat shield 80 and the shell 76 with respect to engine axis A. Although not illustrated, the shell 76 typically includes a plurality of impingement holes that flow cooling air from the cooling plenum 70 and into the cavity 108. From the cavity 108, cooling air is then flowed through heat shield effusion holes and into the combustion chamber 66. In contrast, the boss 106 prevents the dilution aperture 102 from communicating with the cavity 108 and instead functions to flow cooling air directly from the cooling plenum 70 and into the combustion chamber 66.

The boss 106 may be integral, unitary to, and formed as one piece to the heat shield 80. The boss 106 has an axial base portion 107 that may be flush with a hot side 116 (see FIG. 5) of the heat shield 80 that defines the combustion chamber 66, and projects outward from an opposite cold side 118 of the heat shield 80 to a seat 109 of the base portion 107. The seat 109 faces radially outward with respect to the engine axis A and is continuous about the aperture 102 and may have a substantially cylindrical contour for sealable contact to the radially inward side of shell 76. The boss 106 further has a distal portion 111 generally projecting radially outward from the seat 109, through a single opening 113 in the shell 76 and into the plenum 70. The distal end of the distal portion 111 has a continuous end face 120 that surrounds aperture 102, faces radially outward with respect to engine axis, and may be disposed in the plenum 70.

The aperture 102 has first and second dilution holes 122, 124 each having respective centerlines 126, 128 being substantially parallel to one-another and disposed normal to the wall assembly 60. The dilution holes 122, 124 are generally defined by respective first and second grommets 130, 132 of the boss 106. The grommets 130, 132 are discontinuous and connect to one-another at their respective circumferentially extending ends (with respect to centerlines 126, 128). That is, the grommets 120, 132, do not completely circumscribe their respective centerlines 126, 128, but together, the grommets circumscribe the aperture 102. Also and together, the grommets 130, 132 form the continuous seat 109 and the continuous face 120. Both the seat 109 and the face 120 face axially outward with respect to the centerlines 126, 128 and are spaced axially from one another with the seat 109 sealably attached to an inner side 131 of the shell 76 and the face 120 disposed outward from an outer side 133 of the shell 76 and in the plenum 70.

The dilution holes 122, 124 are generally defined by respective inner faces 146, 148 of the respective grommets 130, 132 and may be substantially round and are spaced close enough together so that they communicate radially with respect to the centerlines 126, 128. That is, in consideration of the distal portion 111 of the boss 106 having a substantially consistent wall thickness 134, a distance 136 measured between centerlines 126, 128 is less than the summation of respective distances or radii 138, 140 of the respective dilution holes 122, 124 plus the factor of about two times the wall thickness 134 (see FIG. 4). More particularly, the distance 136 may also be less than the summation of the respective radii 138, 140.

The combustor component 101 further has opposing first and second lobes 142, 144 that project into the aperture 102 from where the grommets 130, 132 of the boss 106 connect to one-another. Each lobe 142, 144 may carry in-part the distal face 120 that generally spans between inner faces 146, 148 at the lobe location and also carried, in-part, by each lobe 142 144. The faces 146, 148 may be contoured such that they conform to the respective radii 138, 140 thereby further defining the respective dilution holes 122, 124. A space or gap 150 between the two lobes 142, 144 may be dependent upon the proximity of the first and second centerlines 126, 128 to one another. That is, it is generally desired to space the centerlines 126, 128 as close together as possible, but not so close that the resultant gap becomes too large causing the holes 122, 124 to lose their respective jet stream effect. The gap 150 may be about or less than the smaller of the two radii 138, 140. It is also understood and contemplated that the integral, unitary, joining of the boss 106 may be to the shell 76 and the sealable joining is to the heat shield 80, or that the boss 106 is not integral to either the shell 76 or the heat shield 80, and instead removably seals to both.

In operation, the first dilution hole 122 may be a primary dilution hole associated with a primary jet stream 152 and the second dilution hole 124 may be a smaller wake hole having an associated wake jet stream 154 (represented by arrows in FIG. 5). The lobes 142, 144 promote segregation of the individual jet streams 152, 154 generally along the respective centerlines 126, 128. This segregation of jet streams while maintaining a close proximity between the primary dilution hole 122 and the wake hole 124 promotes a desirable temperature profile at the combustor exit plane 103. The configuration 104 receives cooling air from the plenum 70, at a high pressure, flows the air through the primary dilution hole 122 and the wake hole 124, and expels the cooling air as individual respective jet streams 152, 154 into the lower pressure combustor chamber 66 for strategically distributed cooling. It is further understood and contemplated that other dilution hole configurations are possible. For example, two wake holes may communicate with a single primary dilution hole. Such configurations shall be dictated upon the needs of engine efficiency, emission standards and the desired temperature profile at the combustor exit plane.

Figure 6:
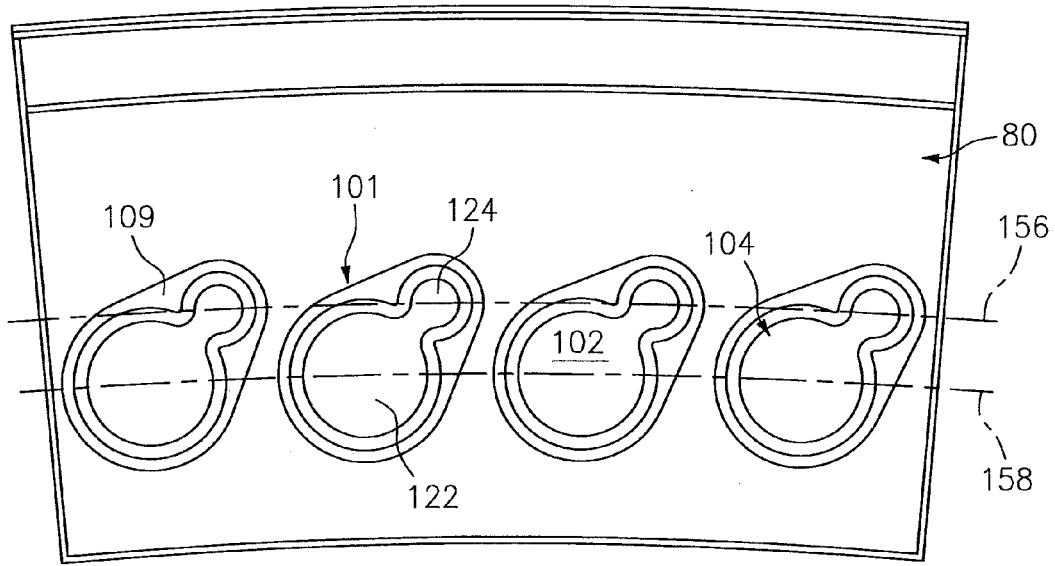
FIG. 6 is a plan view of a heat shield panel having a plurality of the dilution hole configurations.

Referring to FIG. 6, a plurality of dilution hole configurations 104 are illustrated on a single panel of the heat shield 80. The wake holes 124 are spaced circumferentially from one-another and may be aligned to a centerline 156. The primary dilution holes 122 are also spaced circumferentially from one another and may be aligned to a centerline 158 disposed axially downstream from the centerline 156. Each wake hole 124 may also be circumferentially offset from the associated primary dilution hole 122.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A combustor component defining a dilution hole configuration, the combustor component comprising:
    a first grommet defining a first dilution hole having a first centerline and a first diameter; and
    a second grommet defining a second dilution hole having a second centerline and a second diameter that is different that the first diameter;
    wherein the first and second grommets are integrally formed with one-another to form a non-circular aperture having the first dilution hole and the second dilution hole; and
    wherein the non-circular aperture has a cross-sectional geometry comprising a first full circular portion, a second full circular portion and an intermediate portion, and the intermediate portion is between and separates the first full circular portion and the second full circular portion at an intersection between the first grommet and the second grommet.

2. The combustor component set forth in claim 1, further comprising:
    a first lobe;
    a second lobe spaced from and opposing the first lobe; and
    wherein the first and second grommets extend from and connect to the first and second lobes.

3. The combustor component set forth in claim 2, wherein the first and second grommets and the first and second lobes together define a continuously extending face around the first and second centerlines.

4. The combustor component set forth in claim 3, wherein the first and second grommets together define a circumferentially continuous seat axially offset from the face relative to the first and second centerlines.

5. The combustor component set forth in claim 3, wherein the first and second lobes define a gap therebetween, the first dilution hole has a first radius, the second dilution hole has a second radius, and the gap is less than the combined first and second radii.

6. The combustor component set forth in claim 3 wherein the first dilution hole is a primary dilution hole and the second dilution hole is a wake hole.

7. The combustor component set forth in claim 4, further comprising:
a heat shield and a shell with a cooling cavity defined between the heat shield and the shell, wherein the first and second dilution holes communicate through the heat shield and the shell, and the first and second grommets are at least in-part in the cooling cavity.

8. The combustor component set forth in claim 7 wherein the seat is in sealing contact with the shell and the face is defined by a distal end portion of the first and second grommets projecting axially outward from the seat.

9. The combustor component set forth in claim 1, wherein the first and second centerlines are substantially parallel to one-another.

10. A combustor, comprising:
a heat shield including a hot side and an opposite cold side;
a boss projecting outward from the cold side of the heat shield; and
a first lobe projecting from the boss;
the boss and the first lobe together carrying a plurality of concave inner faces that partially define a dilution aperture, the plurality of concave inner faces comprising a first concave inner face with a first diameter and a second concave inner face with a second diameter, wherein a sum of the first diameter and the second diameter is less than a width of the dilution aperture, and the first diameter is different than the second diameter; and
the first lobe carrying a curved convex inner face that further partially defines the dilution aperture.

11. The combustor set forth in claim 10, wherein the boss is flush with the hot side.

12. The combustor set forth in claim 10, wherein the dilution aperture includes first and second dilution holes defined in-part by the first lobe, the first and second dilution holes have respective first and second centerlines, and the first and second dilution holes communicate radially with respect to the first and second centerlines.

13. The combustor set forth in claim 12, further comprising:
a second lobe projecting from the boss opposite the first lobe;
wherein the second lobe carries a second curved convex inner face that further partially defines the dilution aperture.

14. The combustor set forth in claim 13, further comprising:
a first grommet of the boss defining at least in-part the first dilution hole; and
a second grommet of the boss defining at least in-part the second dilution hole connected to the first dilution hole.

15. The combustor set forth in claim 14 wherein the boss is an integral and unitary part of the heat shield.

16. The combustor set forth in claim 15, further comprising:
a shell spaced from the heat shield; and
wherein the boss has a distal portion projecting through a single opening in the shell.

* * * * *